Patented May 14, 1946

2,400,094

UNITED STATES PATENT OFFICE 2,400,094

MOLDING PROCESS

Anthony F. Benning, Woodstown, N. J., and William H. Markwood, Jr., Wilmington, Del., assignors to E. I. du Pont de Nemours & Company, Wilmington, Del., a corporation of Delaware No Drawing. Application March 2, 1944, Serial No. 524,810

2 Claims. (Cl. 18—55)

This invention relates to the art of molding, and more particularly to a new process for shaping polytetrafluoroethylene.

Polytetrafluoroethylene is described in United States Patent 2,230,654. This patent also mentions that polytetrafluoroethylene can be molded by the use of high temperature and pressure. However, due to the peculiar characteristics of polytetrafluoroethylene, methods generally applicable to the molding of thermoplastics are not commercially practical or economical for use with polytetrafluoroethylene.

The properties of polytetrafluoroethylene, among which are unusually high softening point with retention of physical form at temperatures as high as 450° C. and with slow yield under compressive stress due to very high viscosity, are such that conventional molding for the manufacture of massive articles as it is applied to thermoplastic materials which can be liquefied, is difficult and impractical. The molding of polytetrafluoroethylene by the type of compression molding which consists in introducing the finely divided material into a hot mold, applying pressure, and cooling below the setting temperature is also unsatisfactory because the articles stick badly in the mold and lack strength and flexibility. The above mentioned and other methods proposed for molding tetrafluoroethylene are also not as readily applicable as is desired in the manufacture of articles of complex and accurately predetermined shapes which are particularly valuable considerations where speed and economy of operation are important. We have found, however, that polytetrafluoroethylene can be molded by the new steps outlined below by reason of an unusual combination of properties which are possessed by polytetrafluoroethylene but which, in so far as we are aware, either are not possessed by any other polymer suitable for the production of valuable molded products, or have not been appreciated and utilized for the present purpose.

This invention has as an object a new and useful method for obtaining molded products. A further object is a new and practical method for shaping of polytetrafluoroethylene. A further object is the preparation of polytetrafluoroethylene articles of superior tensile strength and flexibility. A still further object is a method for forming polytetrafluoroethylene into articles of intricate shape and accurately predetermined dimensions. Other objects will appear hereinafter.

These objects are accomplished by a method comprising the steps of forming the desired article from powdered polytetrafluoroethylene by cold pressing, heating the cold pressed article in a closed, closely fitting chamber to a temperature of 320°–400° C. under pressure autogenously created during the heating. The material thus shaped is then quenched in a suitable liquid or allowed to cool gradually.

The process claimed herein requires for operability a substance which combines a very high softening point with great thermal stability and with a very high linear coefficient of thermal expansion, which in the case of polytetrafluoroethylene is $50 \times 10^{-6}$. The absence of these requirements in the known successful molding resins may, for example, be illustrated by reference to the phenol-aldehyde resin known by the trade name of Bakelite. This resin has a linear coefficient of expansion of about $22 \times 10^{-6}$, as compared to $10 \times 10^{-6}$ which may be taken as that of the steel in the mold, and the resin cannot without decomposition be heated safely much above 200° C. The differential expansion of the resin over that of the mold resulting from heating from room temperature is only 0.24% and is very much less than that required to compact a powder, which still contains air spaces, into a dense homogeneous mass.

In the best method now known for the practice of our invention the article is formed in its initial shape for the subsequent hot pressing step by suitable means which preferably consists in cold pressing the finely divided polymer to desired form under pressure. When cold pressing the finely divided polymer the cold pressing step is conducted at pressures of at least 100 pounds per square inch, and preferably above 500 pounds per square inch. The best results are obtained with pressures from 500 to 2000 pounds per square inch. The cold pressing can be effected in the same mold subsequently used for the hot pressing, or it can be effected in another mold.

The cold pressed article is placed in a chamber capable of being tightly closed, whose dimensions conform closely to those of the article to be heat treated. The chamber should be made of iron, steel, or other material having a coefficient of thermal expansion substantially lower than that of the tetrafluoroethylene. The cylinder or chamber can be perforated to provide a small hole through which excess polytetrafluoroethylene can extrude. The size of the hole is adjusted so that the back pressure developed is sufficient to result in the desired overall pressure within the cylinder. This chamber is then heated and the autogenous pressure developed during the expansion of the polymer in the heating step is sufficient for the manufacture of the valuable molded articles described herein. The temperature at which the hot pressing step is carried out should lie in the range 320°–400° C. Temperatures of the order of 350° C. are particularly desirable. Rapid cooling through the range from above 320° C. to a temperature below 200° C. is preferred although we have found no bad effect from gradual cooling of the heat treated material. When the article is quenched, this step can be carried out by the use of any suitable liquid, the choice of which will depend primarily on its physical properties. Since the object of the quenching step is very rapid cooling, a liquid of high specific heat and low viscosity is to be preferred. In some cases, liquids of low boiling point and high latent heats of evaporation may be useful. For very rapid cooling, liquefied gases such as nitrogen may be used. The cooling liquid sometimes comes in contact with the polymer, but by reason of the great resistance of the polymer to swelling and chemical attack, almost any liquid can be used. In general, water is preferred because of its low viscosity, high specific heat, low boiling point, high latent heat of evaporation, and economy.

The following examples are further illustrative of the practice of this invention.

*Example I*

Rods of polymer 3" long and 1" in diameter (previously made by cold pressing) were placed in a capped steel pipe of the same internal dimensions, and caps firmly screwed down. The capped pipes were then heated in an oven at 350° C. for 2 hours and then gradually allowed to cool. The thermal expansion during the heating step of the cold pressed polymer produced a high internal pressure within the pipes. The rods were readily removed from the mold and were very tough and resistant to mechanical shock.

*Example II*

Disc of polymer 1 7/16" in diameter and 3/8" thick (previously made by cold pressing) was placed in a close fitting closed mold. The closed mold was then heated in an oven at 350° C. for 2 hours and then quenched in water. The autogenous pressure during the heating step produced a high internal pressure in the closed mold and made for a disc of superior tensile strength and toughness and in which no strain cracks were discernible.

The invention described herein provides a method for molding tetrafluoroethylene which, among other reasons, is valuable in the manufacture of articles for various purposes from this polymer by reason of the complex and intricate shapes which can be obtained, and by reason of the ready production of articles of accurate predetermined shapes. The articles molded by the process claimed herein are hard, tough and from relatively clear to opaque depending on the thickness. These articles, which are inert to the action of organic and inorganic agents, are useful as electrical insulators, agitator paddles for chemical reaction vessels, pistons and diaphragms for pumps handling corrosive liquids.

As many apparently widely different embodiments of this invention may be made without departing from the spirit and scope thereof, it is to be understood that we do not limit ourselves to the specific embodiments thereof except as defined in the appended claims.

We claim:

1. A process for molding polytetrafluoroethylene which comprises cold pressing to desired shape the finely divided polymer under superatmospheric pressure, and heating the article thus formed in a closed, closely fitting mold at a temperature of 320° to 400° C. under the autogenous pressure resulting from the expansion of the polytetrafluoroethylene in said closed mold during said heating, cooling the molded article to a temperature below that of said heating, and removing it from the mold.

2. In a process for obtaining molded products of polytetrafluoroethylene, the step comprising heating a preformed polytetrafluoroethylene article in a closed, closely fitting mold at a temperature of 320° C. to 400° C. under the autogenous pressure resulting from the expansion of the polytetrafluoroethylene in said closed mold during said heating, cooling the molded article to a temperature below that of said heating and removing it from the mold.

ANTHONY F. BENNING.
WILLIAM H. MARKWOOD, Jr.